(12) United States Patent
Sugishita

(10) Patent No.: US 6,829,898 B2
(45) Date of Patent: Dec. 14, 2004

(54) GAS TURBINE COMBINED PLANT AND METHOD OF OPERATING THE SAME

(75) Inventor: Hideaki Sugishita, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 62 days.

(21) Appl. No.: 10/329,401

(22) Filed: Dec. 27, 2002

(65) Prior Publication Data

US 2003/0136130 A1 Jul. 24, 2003

(30) Foreign Application Priority Data

Jan. 24, 2002 (JP) ........................................ 2002-016067

(51) Int. Cl.$^7$ ............................... F02C 6/18; F02C 7/10
(52) U.S. Cl. .................. 60/772; 60/39.182; 60/39.511; 122/7 B
(58) Field of Search ............................ 60/772, 39.182, 60/39.511; 122/7 R, 7 B

(56) References Cited

U.S. PATENT DOCUMENTS

| | | | |
|---|---|---|---|
| 3,422,800 A | | 1/1969 | La Haye |
| 3,675,426 A | * | 7/1972 | Vidal et al. ............... 60/39.182 |
| 4,369,624 A | * | 1/1983 | Hamm et al. ............... 60/39.12 |
| 5,365,730 A | * | 11/1994 | Bruckner et al. ......... 60/39.182 |
| 5,404,708 A | * | 4/1995 | Sigling et al. ........... 60/39.182 |

FOREIGN PATENT DOCUMENTS

| | | |
|---|---|---|
| DE | 19612921 A1 | 10/1997 |
| DE | 19943782 A1 | 3/2001 |
| EP | 0061262 A1 * | 9/1982 |
| EP | 0953732 A2 | 11/1999 |
| FR | 1.352.876 | 1/1964 |
| GB | 2014662 A * | 8/1979 |
| GB | 2311824 A * | 8/1997 |
| JP | 2000-27662 | 1/2000 |

\* cited by examiner

*Primary Examiner*—Ted Kim
(74) *Attorney, Agent, or Firm*—Wenderoth, Lind & Ponack, L.L.P.

(57) ABSTRACT

A piping guides exhaust gas of a gas turbine to a heat recovery steam generator (HRSG). The piping is provided at an outlet of the exhaust gas and is branched into two portions at a branch portion upstream of the HRSG, with one portion being connected to a high-pressure superheater provided in the HRSG and the other portion being connected to a regenerator. Exhaust gas supplied to the high-pressure superheater superheats saturated steam generated by a high-pressure evaporator in the HRSG. Exhaust gas supplied to the regenerator is heat-exchanged with combustion air generated by a compressor in the gas turbine. The exhaust gas having been heat-exchanged is supplied to between the high-pressure superheater and the high-pressure evaporator via another piping extending between the regenerator and the HRSG.

19 Claims, 10 Drawing Sheets

— GAS TURBINE COMBINED PLANT OF THIS INVENTION
---- CONVENTIONAL GAS TURBINE COMBINED PLANT

GAS TURBINE COMBINED PLANT AND METHOD OF OPERATING THE SAME

BACKGROUND OF THE INVENTION

1) Field of the Invention

The present invention relates to a gas turbine combined plant, and more particularly to a gas turbine combined plant capable of improving combined efficiency as compared with that of a conventional plant, and a method of operating the same.

2) Description of the Related Art

A gas turbine combined plant for making effective use of thermal energy of exhaust gas has been recently constructed. The thermal energy is obtained by recovering thermal energy contained in high-temperature exhaust gas of a gas turbine by a heat recovery steam generator (HRSG) to drive a steam turbine. FIG. 12 is an explanatory diagram showing a conventional gas turbine combined plant. In this gas turbine combined plant 800, thermal energy contained in exhaust gas of a gas turbine 820 is recovered by an HRSG 810 to generate steam, the steam is supplied to a steam turbine 860 connected with a generator 868 to thereby drive the generator 868, and thereby electric power is generated.

Aiming at further improvement in combined efficiency, a regenerative type gas turbine combined plant has been used. In this gas turbine combined plant, a regenerator uses exhaust gas of a gas turbine for heating of combustion air. FIG. 13 is an explanatory diagram showing a conventional regenerative type gas turbine combined plant. This regenerative type gas turbine combined plant has a regenerator 930, to which exhaust gas of a gas turbine 920 is supplied. A temperature of combustion air is then increased by heat exchange between the exhaust gas of the gas turbine 920 and combustion air compressed by a compressor 922. As a result, a temperature of the combustion air at an inlet of a combustor 923 can be increased, and hence an amount of fuel supplied to the gas turbine 920 can be reduced. Therefore, efficiency of the gas turbine and efficiency of the combined plant can be increased. With such structure, combined efficiency in the gas turbine combined plant has been improved to the latter half of 50%–60% range, on a lower heat value (LHV) base.

In regenerative type gas turbine combined plant 900, a temperature of steam generated by HRSG 910, that is, a temperature at an inlet of the steam turbine decreases, thereby improvement in combined efficiency by regeneration is suppressed. FIG. 14 is a Q-T diagram showing a relationship between a steam temperature and a quantity of heat exchange in a conventional HRSG. The line showing higher temperature expresses changes of exhaust gas, and the line showing lower temperature expresses changes of steam (water). An area indicated by diagonal lines expresses a magnitude of loss of heat exchange, and as this area increases, the loss of heat exchange increases.

As seen from FIG. 14, in this regenerative type gas turbine combined plant 900, a steam temperature at an inlet of a high-pressure superheater 940 cannot be sufficiently high, and therefore loss of beat exchange of the high pressure superheater 940 increases. Further, since a temperature difference between an inlet temperature and an outlet temperature of exhaust gas in a high-pressure evaporator 950 is large, loss of heat exchange in the high-pressure evaporator 950 cannot be sufficiently reduced.

SUMMARY OF THE INVENTION

It is an object of the present invention to provide a gas turbine combined plant capable of improving at least one of gas turbine efficiency and combined efficiency as compared with a conventional gas turbine combined plant, and also a method of operating the plant.

The gas turbine combined plant according to one aspect of this invention comprises a gas turbine, an exhaust heat recovery unit that recovers thermal energy contained in an exhaust gas of the gas turbine in a heat recovery stage having at least a superheating unit and an evaporation unit, and an air heating unit that heats combustion air of the gas turbine by the exhaust gas. The plant also comprises an exhaust gas branch line that has a branch portion for branching the exhaust gas and supplies the exhaust gas to the exhaust heat recovery unit and the air heating unit, and an exhaust gas supply line that supplies the exhaust gas, after heating the combustion air of the gas turbine in the air heating unit, to between the superheating unit and the evaporation unit.

The gas turbine combined plant according to another aspect of this invention comprises a gas turbine, an exhaust heat recovery unit that recovers thermal energy contained in exhaust gas of the gas turbine by providing a plurality of heat recovery stages respectively having at least a superheating unit and an evaporation unit, and air heating units in a plurality of stages that heat combustion air of the gas turbine by the exhaust gas. The plant also comprises an exhaust gas branch line that has a branch portion for branching the exhaust gas and supplies the exhaust gas to the exhaust heat recovery unit and the air heating units in the plurality of stages, a first-stage exhaust gas supply line that supplies the exhaust gas, after heating combustion air of the gas turbine in a first-stage air heating unit, to between the superheating unit and the evaporation unit provided in a first heat recovery stage, and a subsequent-stage exhaust gas supply line that supplies the exhaust gas, after heating the combustion air of the gas turbine in the air heating unit(s) in and after a second stage, to between the superheating unit and the evaporation unit provided in the heat recovery stage(s) in and after a second heat recovery stage.

A method of operating a gas turbine combined plant according to still another aspect of this invention, comprises reducing a flow rate of exhaust gas supplied to an air heating unit as a temperature of the exhaust gas increases, at a time of operating the gas turbine combined plant including a gas turbine, an exhaust heat recovery unit that recovers thermal energy from exhaust gas of the gas turbine, and the air heating unit that heats combustion air of the gas turbine by a part of the exhaust gas of the gas turbine.

The method of operating a gas turbine combined plant according to still another aspect of this invention, comprises reducing a flow rate of exhaust gas supplied to an air heating unit as a load of the gas turbine combined plant increases, at a time of operating the gas turbine combined plant including a gas turbine, an exhaust heat recovery unit that recovers thermal energy from exhaust gas of the gas turbine, and the air heating unit that heats combustion air of the gas turbine by a part of the exhaust gas of the gas turbine.

These and other objects, features and advantages of the present invention are specifically set forth in or will become apparent from the following detailed descriptions of the invention when read in conjunction with the accompanying drawings.

DETAILED DESCRIPTION OF THE PREFERRED EMBODIMENTS

Embodiments of the present invention will be explained in detail below with reference to the drawings, but this invention is not limited by these embodiments. Components in the following embodiments should include components that are easily assumed by those skilled in the art, or are substantially the same.

A first embodiment of this invention will be explained below.

Figure 1A:
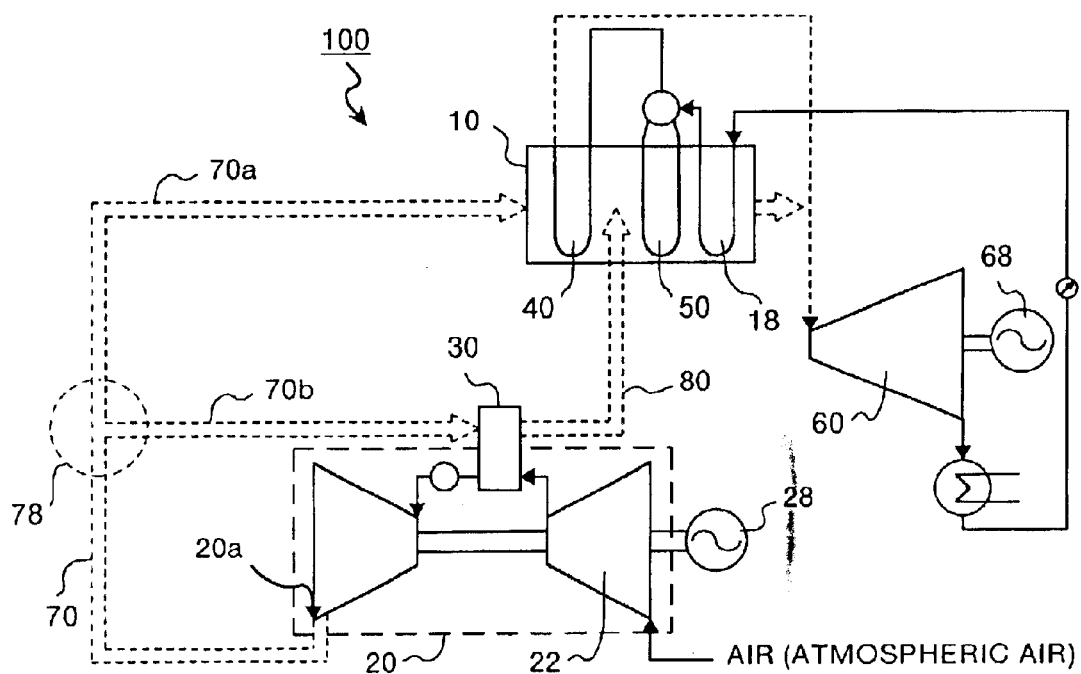
FIG. 1A and FIG. 1B are explanatory diagrams each showing a gas turbine combined plant according to a first embodiment of this invention.
Figure 1B:
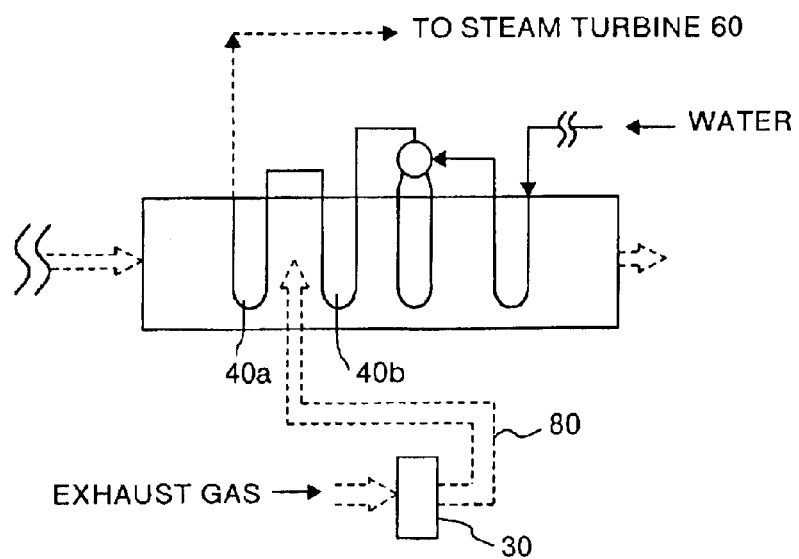

FIG. 1A and FIG. 1B are explanatory diagrams each showing a gas turbine combined plant according to a first embodiment of this invention. In this gas turbine combined plant 100, exhaust gas of a gas turbine 20 to be supplied to an HRSG 10 as an exhaust heat recovery unit is branched, and one of these branches of the exhaust gas is heat-exchanged with combustion air of the gas turbine 20 in a regenerator 30 being an air heating unit. This exhaust gas after heat exchange is supplied to between a high-pressure superheater 40, being a superheating unit, and a high-pressure evaporator 50, being an evaporation unit, each of which is provided in the HRSG 10. The other branch of the exhaust gas is supplied to an inlet of the high-pressure superheater 40 in the HRSG 10.

The gas turbine combined plant 100 is provided with the HRSG 10, the gas turbine 20, and a high-pressure steam turbine 60. The HRSG 10 is provided with the high-pressure superheater 40 being the superheating unit, and the high-pressure evaporator 50 being the evaporation unit, thereby constituting a heat recovery stage that recovers thermal energy contained in the exhaust gas of the gas turbine 20. As shown in FIG. 1A, the heat recovery stage may be configured by adding a high-pressure economizer 18. By having such a configuration, feed water to be supplied to the high-pressure evaporator 50 can be warmed by the high-pressure economizer 18, and therefore the high-pressure evaporator 50 can produce steam more efficiently. Further, thermal energy of the exhaust gas can be recovered more effectively by the high-pressure economizer 18, and hence efficiency of the HRSG 10 can be increased, which is preferable.

At an exhaust gas outlet 20a of the gas turbine 20, there is provided a piping 70 that is an exhaust gas branch line for guiding the exhaust gas, after having driven the gas turbine 20, to the HRSG 10. This piping 70 is branched at a branch portion 78 provided on an upstream side of the HRSG 10, with one branch being connected to the HRSG 10 and the other branch being connected to the regenerator 30. The exhaust gas of the gas turbine 20 is supplied to the high-pressure superheater 40 provided in the HRSG 10 and to the regenerator 30. The exhaust gas supplied to the high-pressure superheater 40 superheats saturated steam produced by the high-pressure evaporator 50, to thereby produce superheated steam to be supplied to the high-pressure steam turbine 60.

The exhaust gas supplied to the regenerator 30 is heat-exchanged with high-temperature and high-pressure combustion air generated by a compressor 22, in the gas turbine 20, to heat the combustion air. The exhaust gas after having been heat-exchanged in the regenerator 30 is supplied to between the high-pressure superheater 40 and the high-pressure evaporator 50, which are provided in the HRSG 10, passing through a piping 80 that is an exhaust gas supply line being a connection between the regenerator 30 and the HRSG 10. This exhaust gas is supplied to an inlet of the high-pressure superheater 40 and united with the exhaust gas that has superheated the steam, and then fed to the high-pressure evaporator to evaporate water, of which a temperature is raised by the high-pressure economizer 18. As shown in FIG. 1B, when a plurality of high-pressure superheaters is to be used, combustion air having passed through the regenerator 30 may be supplied to between an upstream high-pressure superheater 40a and a downstream high-pressure superheater 40b.

Downstream of the branch portion 78 of the piping 70, an internal cross section of a piping 70a that supplies exhaust gas to the HRSG 10 is different from that of a piping 70b that supplies exhaust gas to the regenerator 30. This is because higher combined efficiency is obtained by supplying a proper amount of exhaust gas to the HRSG 10 and the regenerator 30. The amount of exhaust gas to be supplied to the HRSG 10 varies according to a size of the plant and a load at a time of operation. Therefore, though not clear from FIG. 1A, in the gas turbine combined plant 100, the internal cross section of the piping 70a is adjusted so as to obtain a highest combined efficiency at a time of rated load. A variable restrictor or the like may be provided in the piping 70a to change the internal cross section of the piping 70a according to a load of the gas turbine combined plant 100. By performing such a control, even if the load changes, a proper amount of exhaust gas can be supplied to the HRSG 10, and therefore the gas turbine combined plant can be operated while maintaining high combined efficiency, which is preferable. This point will be described later.

A generator 28 is connected to the gas turbine 20, and the gas turbine 20 is operated to drive the generator 28, to thereby generate electric power. The exhaust gas of the gas turbine 20 is guided to the HRSG 10, and thermal energy is recovered here. It is noted that the HRSG 10 used in the first embodiment is a so-called one-stage type HRSG. This invention is also applicable for a two-stage type or a three-stage type HRSG having a plurality of heat recovery stages, described later. In the HRSG 10, steam is generated by the thermal energy recovered from the exhaust gas of the gas turbine 20, and this steam is supplied to a high-pressure steam turbine 60, to drive this turbine. Since the high-pressure steam turbine 60 is also connected to a generator 68, the generator 68 is driven by the high-pressure steam turbine 60 to thereby generate electric power.

Figure 13:
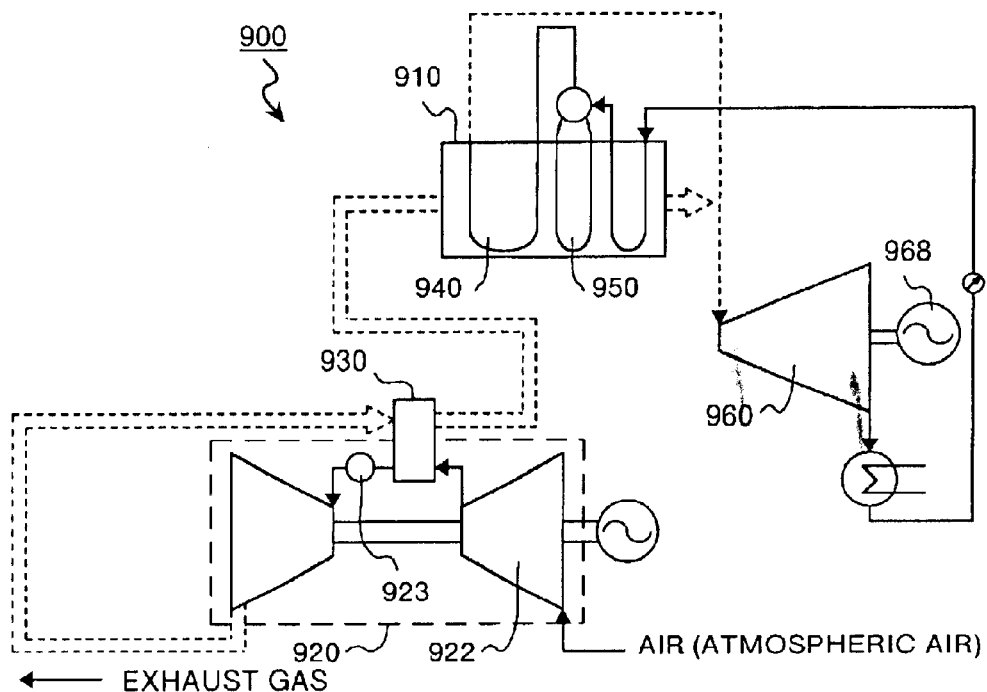
FIG. 13 is an explanatory diagram showing a conventional regenerative type gas turbine combined plant.
Figure 14:
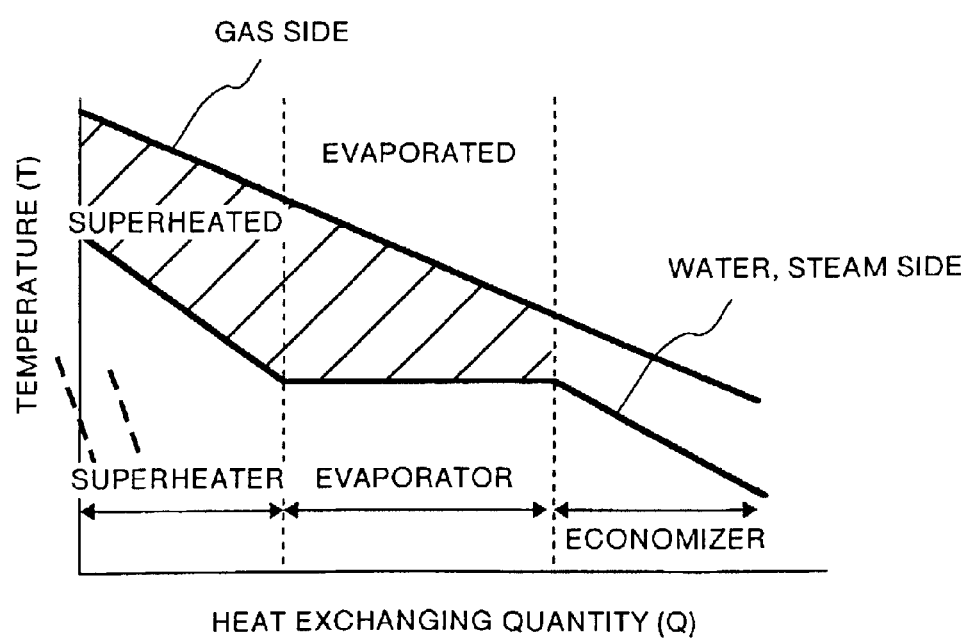
FIG. 14 is a Q-T diagram showing a relationship between steam temperature in a conventional HRSG and heat exchanging quantity.

In this gas turbine combined plant 100, the exhaust gas of the gas turbine 20 is branched and supplied to the HRSG 10 and the regenerator 30. In the conventional art, exhaust gas which has passed through the regenerator 30 and whose temperature has dropped, is supplied to HRSG 910 (see FIG. 13). However, in this gas turbine combined plant 100, high-temperature exhaust gas can be supplied to the high-pressure superheater 40 in the HRSG 10. Further, since the exhaust gas is branched upstream of the HRSG 10, and a part thereof is supplied to the regenerator 30, a flow rate of the exhaust gas to be supplied to the high-pressure superheater 40 can be reduced. Thereby, a heat exchange loss can be reduced as compared with that of the conventional gas turbine combined plant in which all exhaust gas is supplied to a high-pressure superheater 940 (see FIG. 13).

The exhaust gas having passed through the regenerator 30 loses thermal energy during a process of heating the combustion air, and a temperature thereof drops. Since the exhaust gas whose temperature has been dropped is supplied to the high-pressure evaporator 50, a temperature of exhaust gas at an inlet of the high-pressure evaporator 50 in the HRSG 10 can be decreased relative to that of the conventional gas turbine combined plant. By this action, a temperature difference between an inlet temperature and an outlet temperature in the high-pressure evaporator 50 can be made smaller than that of the conventional gas turbine combined plant. Thereby, a heat exchange loss in the high-pressure evaporator 50 can be reduced. Further, since the regenerator 30 is provided, combustion air compressed by the compressor 22 is supplied with heat of the exhaust gas in the regenerator 30 to thereby raise a temperature of the combustion air, and hence efficiency of the gas turbine 20 is improved.

Figure 2:
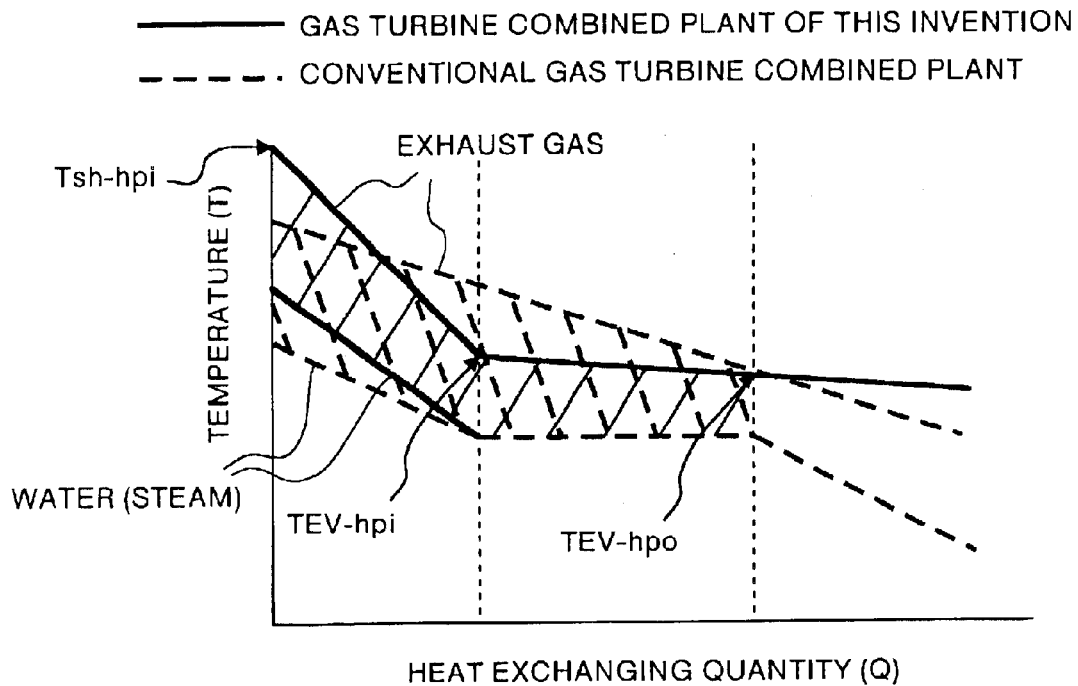
FIG. 2 is a Q-T diagram of the gas turbine combined plant according to the first embodiment and a conventional gas turbine combined plant.

This matter will be explained with reference to a Q-T diagram for the HRSG. FIG. 2 is a Q-T diagram showing the gas turbine combined plant according to the first embodiment and a conventional gas turbine combined plant. A solid line in the figure shows the plant according to the first embodiment, and a dotted line in the figure shows the plant according to the conventional gas turbine combined plant. A line showing a higher temperature of these lines indicates changes of exhaust gas, and a line showing a lower temperature indicates changes of steam (water). An area indicated by diagonal lines in the figure expresses a magnitude of a loss of the heat exchange, and as this area increases, a loss of heat exchange increases.

In this gas turbine combined plant 100, the exhaust gas of the gas turbine 20 is branched, and one of the branches of the exhaust gas is directly supplied to the high-pressure superheater 40 in the HRSG 10. Therefore, as shown in FIG. 2, inlet temperature $T_{sh\text{-}hpi}$ of the high-pressure superheater can be increased as compared with the conventional gas turbine combined plant. By this action, steam temperature $T_{sh\text{-}hpi}$ to be supplied to the high-pressure steam turbine 60 (see FIG. 1A) can be increased as compared with the conventional gas turbine combined plant, and therefore efficiency of the high-pressure steam turbine 60 can be improved as compared with the conventional gas turbine combined plant. Further, since the exhaust gas is branched, an amount of exhaust gas to be supplied to the high-pressure superheater 40 can be reduced as compared with the conventional gas turbine combined plant, and heat exchange loss can also be reduced by this action.

Figure 12:
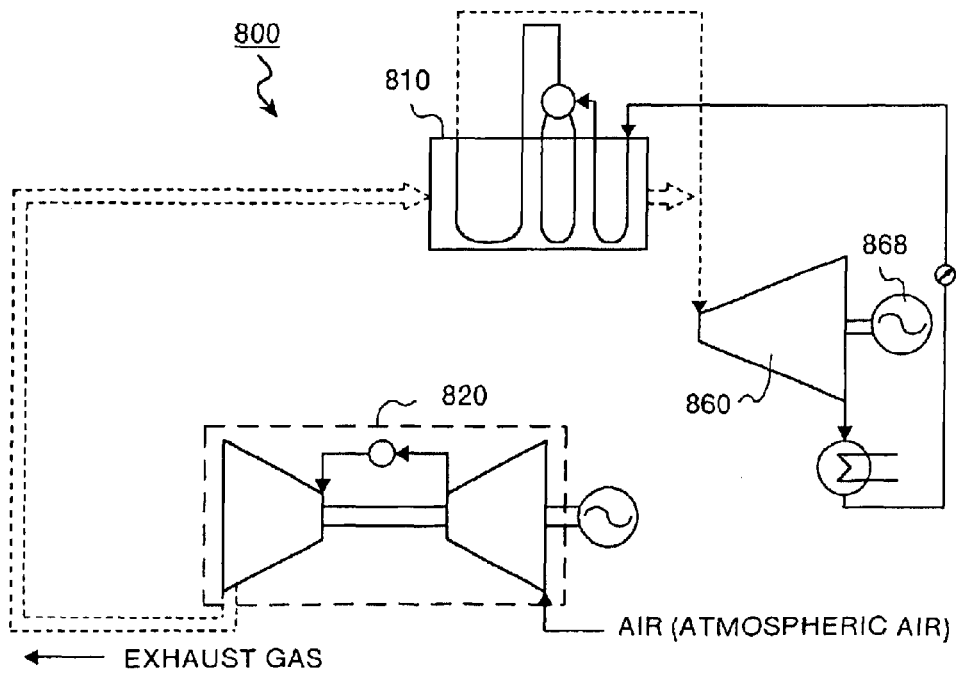
FIG. 12 is an explanatory diagram showing the conventional gas turbine combined plant.

One of the branches of the exhaust gas of the gas turbine is supplied to the regenerator 30 (see FIG. 1A), where a temperature of the combustion air is raised and then supplied to between the high-pressure superheater 40 and the high-pressure evaporator 50. Thereby, inlet temperature $T_{EV\text{-}hpi}$ of the high-pressure evaporator can be dropped as compared with the conventional gas turbine combined plant, and hence a temperature difference between inlet temperature $T_{EV\text{-}hpi}$ and outlet temperature $T_{EV\text{-}hpi}$ in the high-pressure evaporator 50 can be made smaller as compared with the conventional gas turbine combined plant. By this action, quantity of heat exchange in the high-pressure evaporator 50 can be increased as compared with the conventional gas turbine combined plant. By these actions, as seen from FIG. 2, the area indicated by the diagonal lines becomes smaller than in the conventional gas turbine combined plant, and hence a heat exchange loss in the HRSG 10 according to this invention can be reduced as compared with conventional HRSGs 810 and 910 (see FIG. 12 and FIG. 13).

Figure 3:
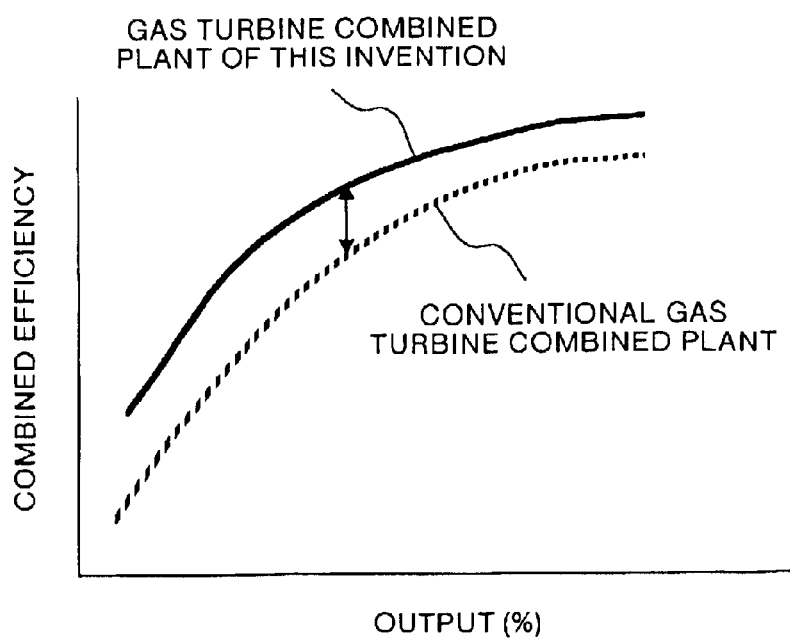
FIG. 3 is an explanatory diagram showing a relationship between combined efficiency and output of the gas turbine combined plant.

FIG. 3 is an explanatory diagram showing a relationship between combined efficiency and output of the gas turbine combined plant. The solid line in the figure shows the gas turbine combined plant according to this invention, and the dotted line shows the conventional gas turbine combined plant. As seen from this figure, the combined efficiency of the gas turbine combined plant 100 is higher than that of conventional gas turbine combined plants 800 and 900 (see FIG. 12 and FIG. 13) over the entire output region. The degree of efficiency is improved by about 1% in absolute value, as compared with the conventional gas turbine combined plant 800 or 900. Thereby, fuel cost of the gas turbine combined plant 100 can be reduced. Further, discharge of $NO_x$ and $CO_2$ can be suppressed by improvement in the combined efficiency. For example, it is considered that the combined efficiency has been improved from 58% to 59% on an LHV base. In this case, in a large power station, fuel cost can be suppressed by about 500 million Yen per year. Further, discharge of $NO_x$ and $CO_2$ is reduced at a rate of about 1.7%.

At present, discharge of $NO_x$ and $CO_2$ is reduced by an NOx removal system, $CO_2$ absorption equipment, and the like, but cost for investment in the plant and equipment increases as this equipment becomes larger, and accordingly, labor and cost for maintenance also increases. Therefore, there is a demand for simplifying the equipment by reducing discharge of $NO_x$ and $CO_2$ contained in the exhaust gas as much as possible. This gas turbine combined plant 100 meets this demand.

A second embodiment of this invention will be explained below.

Figure 4A:
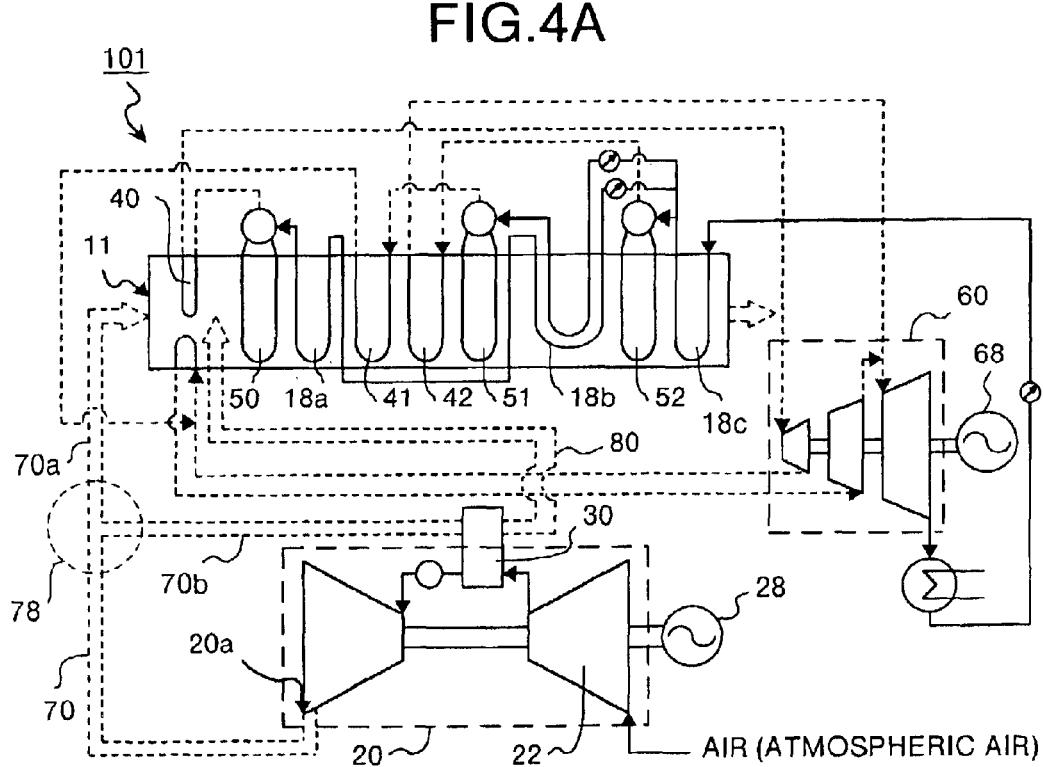
FIG. 4A and FIG. 4B are explanatory diagrams each showing a gas turbine combined plant according to a second embodiment of this invention.
Figure 4B:
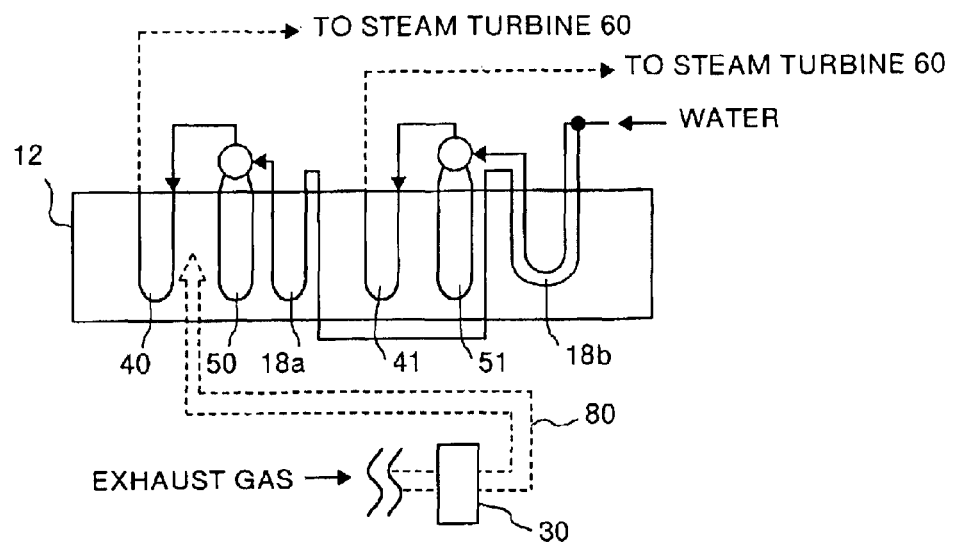

FIG. 4A and FIG. 4B are explanatory diagrams each showing a gas turbine combined plant according to a second embodiment of this invention. Gas turbine combined plant 101 has substantially the same configuration as that of the gas turbine combined plant 100 (see FIG. 1A) according to the first embodiment. However, the plant 101 is different in that a plurality of heat recovery stages, each having at least a superheating unit and an evaporation unit, is provided in an HRSG 11, being an exhaust heat recovery unit. The rest of the configuration is the same as that of the first embodiment, and therefore an explanation thereof is omitted and the same components are denoted by the same reference symbols. FIG. 4A shows an example of using a three-stage type HRSG 11 having three heat recovery stages, and FIG. 4B shows an example (only the HRSG 12) of using a two-stage type HRSG 12 having two heat recovery stages.

The HRSG 11 comprises a high-pressure heat recovery stage having a high-pressure superheater 40 as a superheating unit, a high-pressure evaporator 50 as an evaporation unit, and a high-pressure economizer 18a. The HRSG 11 also comprises an intermediate-pressure heat recovery stage having an intermediate-pressure superheater 41 and a low-pressure superheater 42 as superheating units, an intermediate-pressure evaporator 51 as an evaporation unit, and an intermediate-pressure economizer 18b. The HRSG 11 further comprises a low-pressure heat recovery stage having a low-pressure evaporator 52 as an evaporation unit, and a low-pressure economizer 18c (see FIG. 4A). Further, the two-stage type HRSG 12 comprises a high-pressure heat recovery stage having a high-pressure superheater 40 as a superheating unit, a high-pressure evaporator 50 as an evaporation unit, and a high-pressure economizer 18a. The two-stage type HRSG 12 also comprises an intermediate-pressure heat recovery stage having an intermediate-pressure superheater 41 as a superheating unit, an intermediate-pressure evaporator 51 as an evaporation unit, and an intermediate-pressure economizer 18b (see FIG. 4B).

In either the HRSG 11 or 12, exhaust gas of gas turbine 20 is branched at branch portion 78 of piping 70 that is an exhaust gas branch line, and these branches of gas are supplied to the HRSG 11 and to the regenerator 30 being an air heating unit, respectively. The regenerator 30 and the HRSG 11 are connected by piping 80 which is an exhaust gas supply line, so that the exhaust gas having passed through the regenerator 30 is supplied to between the high-pressure superheater 40 and the high-pressure evaporator 50, which are provided in the HRSG 11.

Since the gas turbine combined plant 101 has such a configuration, exhaust gas having a higher temperature than in the conventional gas turbine combined plant can be supplied to the high-pressure superheater 40 in the HRSG 11. Further, the exhaust gas having passed through the regenerator 30 loses thermal energy during a process of heating combustion air, and a temperature thereof drops. Since the exhaust gas whose temperature has dropped is supplied to the high-pressure evaporator 50, a difference in temperature between the exhaust gas at an inlet and that at an outlet of the high-pressure evaporator 50 can be made smaller than in the conventional gas turbine combined plant. By these actions, a heat exchange loss between the high-pressure superheater 40 and the high-pressure evaporator 50 can be reduced as compared with a conventional manner. Further, since combustion air compressed by compressor 22 rises in temperature by virtue of heat of the exhaust gas in the regenerator 30, efficiency of gas turbine 20 is improved. By these actions, combined efficiency in the gas turbine combined plant 101 can be increased as compared with the conventional manner, and hence fuel cost can be reduced, and discharge of $NO_x$ and $CO_2$ can be reduced as compared with the conventional gas turbine combined plant. Heat recovery in the gas turbine combined plant 101 is not limited to the three stages, but if there are too many stages, a configuration of the HRSG 11 becomes complicated. Therefore, two to four stages are preferable.

A third embodiment of this invention will be explained below.

Figure 5:
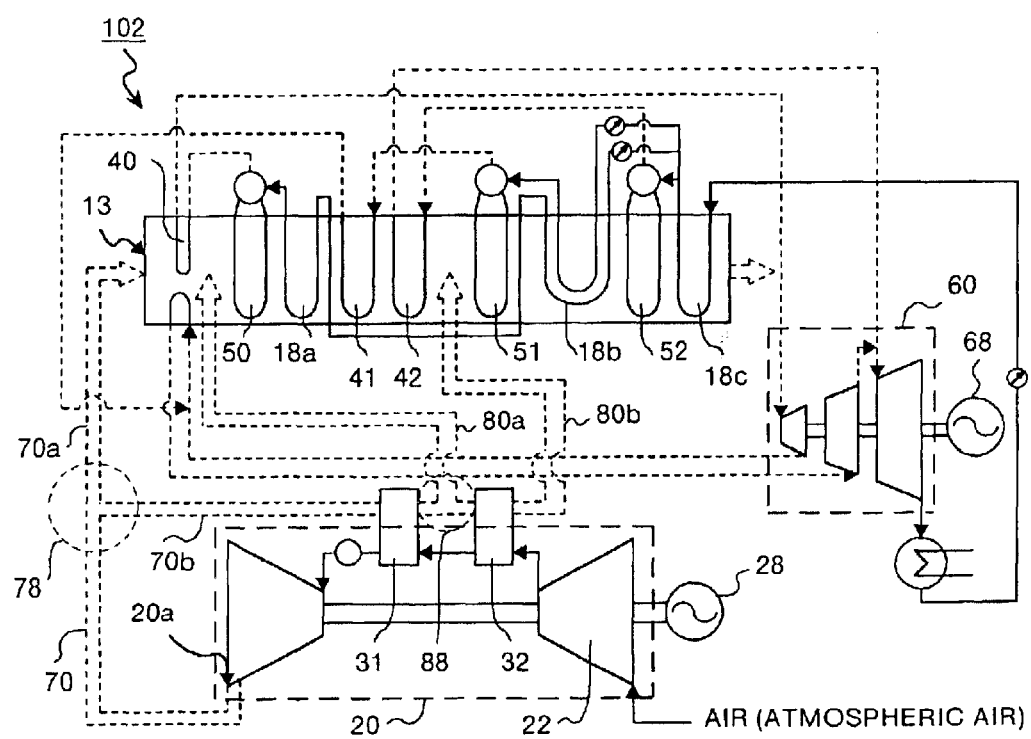
FIG. 5 is an explanatory diagram showing a gas turbine combined plant according to a third embodiment of this invention.

FIG. 5 is an explanatory diagram showing a gas turbine combined plant according to a third embodiment of this invention. Gas turbine combined plant 102 has substantially the same configuration as that of the gas turbine combined plant 101 (see FIG. 4A) according to the second embodiment, but it is different in that the plant 102 is provided with a plurality of regenerators being air heating units, and that exhaust gas having passed through respective regenerators is supplied to a heat recovery stage having at least a superheating unit and an evaporation unit that are provided in an HRSG 13 being an exhaust heat recovery unit, according to a temperature condition required by the heat recovery stage. The rest of the configuration is the same as that of the second embodiment, and therefore an explanation thereof is omitted and the same components are denoted by the same reference symbols. Though not shown, the gas turbine combined plant 102 is also applicable for a two-stage type HRSG, like the gas turbine combined plant 101 according to the second embodiment.

The gas turbine combined plant 102 is provided with two regenerators as a plurality of air heating units; that is, a first regenerator 31 and a second regenerator 32 being the air heating units. An outlet of the first regenerator 31 and the HRSG 13 are connected by a piping 80a, being a first-stage exhaust gas supply line, so that exhaust gas discharged from the first regenerator 31 is supplied to between high-pressure superheater 40 and high-pressure evaporator 50. An outlet of the second regenerator 32 and the HRSG 13 are connected by a piping 80b, being a subsequent-stage exhaust gas supply line, so that exhaust gas discharged from the second regenerator 32 is supplied to between intermediate-pressure superheater 41 and intermediate-pressure evaporator 51. Exhaust gas of gas turbine 20 is branched at branch portion 78 of piping 70, and then passes through the regenerators in order of the first regenerator 31 and the second regenerator 32. On the other hand, air compressed by compressor 22 passes through the regenerators in order of the second regenerator 32 and the first regenerator 31, and is heat-exchanged with exhaust gas during this process, to thereby raise a temperature thereof.

Since the exhaust gas passes through the regenerators in the above order, temperature $t_{ro1}$ of the exhaust gas discharged from the first regenerator 31 becomes higher than temperature $t_{ro2}$ of the exhaust gas discharged from the second regenerator. Therefore, the exhaust gas discharged from the first regenerator 31 is branched at a branch portion 88, and then is made to pass through the piping 80a and supplied to between the high-pressure superheater 40 and the high-pressure evaporator 50. The exhaust gas discharged from the second regenerator 32 is made to pass through the piping 80b and supplied to between the intermediate-pressure superheater 41 and the intermediate-pressure evaporator 51. In this example, the intermediate-pressure superheater 41 and the low-pressure superheater 42 are provided upstream of the intermediate-pressure evaporator 51, but as shown in FIG. 5, the exhaust gas discharged from the second regenerator 32 may be supplied to between the low-pressure superheater 42 and the intermediate-pressure evaporator 51. Further, the exhaust gas discharged from the second regenerator 32 may be supplied to between the intermediate-pressure superheater 41 and the low-pressure superheater 42.

By having such a configuration, exhaust gas having a more adequate temperature can be supplied to each heat recovery stage, and therefore loss at a time of heat exchange in the HRSG 13 can be reduced. Further, since the regenerator is provided in two stages, temperature of the air compressed by the compressor 22 can be increased more efficiently. If a temperature of the exhaust gas discharged from the second regenerator 32 is low and heat exchange loss is rather increased by supplying the exhaust gas to between the intermediate-pressure superheater 41 and the intermediate-pressure evaporator 51, the exhaust gas may be supplied to an inlet of the low-pressure evaporator 52. Thereby, a difference between temperature of the exhaust gas at the inlet and that at the outlet of the low-pressure evaporator 52 can be made small, and heat exchange loss in the low-pressure evaporator 52 can be suppressed to be low while effectively recovering thermal energy of the exhaust gas. An example of using the air heating units in two stages has been explained above, but in this invention, the number of stages is not limited to two, and the number of stages may be properly changed according to the number of the heat recovery stages equipped in the exhaust heat recovery unit. Further, in the explanation, an exhaust heat recovery unit having three heat recovery stages has been explained, but the number of the heat recovery stages may be more than three. However, as described above, if the number of the heat recovery stages is increased, structure of the exhaust heat recovery unit becomes complicated. Therefore, when a plurality of heat recovery stages is provided, two to four stages are preferable. Corresponding to this, the number of stages of the air heating unit is preferably from two to four.

To supply exhaust gas having more appropriate temperature to each of the heat recovery stages, it is desired to optimize a heat exchanging quantity in the first regenerator 31 and the second regenerator 32. This is because exhaust gas having more appropriate temperature can be supplied to each of the heat recovery stages, thereby a heat exchange loss can be further reduced, and combined efficiency can be further increased. As described later, an optimum temperature of exhaust gas to be supplied to each of the heat recovery stages also changes, according to a load of the gas turbine combined plant 102. Therefore, the heat exchanging quantity in the first regenerator 31 and the second regenerator 32 may be made variable to thereby always supply exhaust gas having an optimum temperature, even if the load of the gas turbine combined plant 102 changes.

Figure 6A:
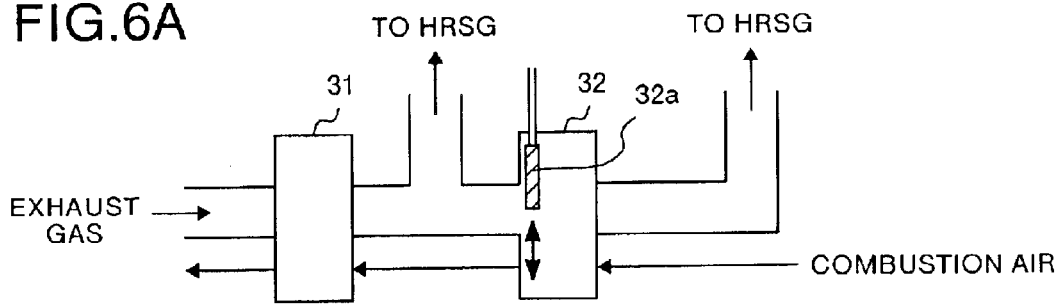
FIG. 6A to FIG. 6D are explanatory diagrams each showing a unit that changes a heat exchanging quantity in a regenerator.

FIG. 6A to FIG. 6D are explanatory diagrams each showing a unit that changes a heat exchanging quantity in the regenerator. The unit that changes this heat exchanging quantity includes a unit that changes a flow rate of exhaust gas to be supplied to each regenerator. As such a flow rate adjusting unit, for example, as shown in FIG. 6A, a shield 32a that can change an area of an exhaust gas inlet of the second regenerator 32 may be provided at an exhaust gas inlet or outlet of the second regenerator 32. Corresponding to a load of the gas turbine combined plant 102, this shield 32a is shifted, to adjust a flow rate of exhaust gas that flows into the second regenerator 32. By changing the flow rate of exhaust gas that flows into the second regenerator 32, a flow rate in the first regenerator 31 upstream thereof also changes. For example, when it is desired to decrease a heat exchanging quantity in the first regenerator 31 and increase a heat exchanging quantity in the second regenerator 32, the shield 32a may be adjusted so as to increase the flow rate of exhaust gas flowing into the second regenerator 32. Further, when it is desired to increase a heat exchanging quantity in the first regenerator 31 and decrease a heat exchanging quantity in the second regenerator 32, the shield 32a may be adjusted so as to decrease a flow rate of exhaust gas flowing into the second regenerator 32.

Figure 6B:
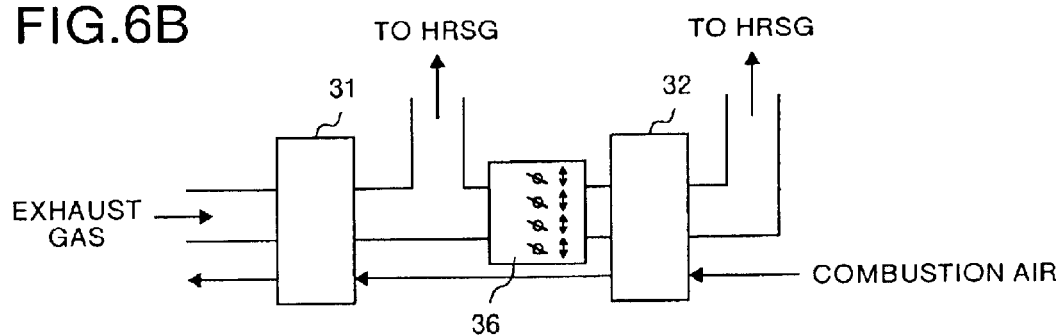
Figure 6C:
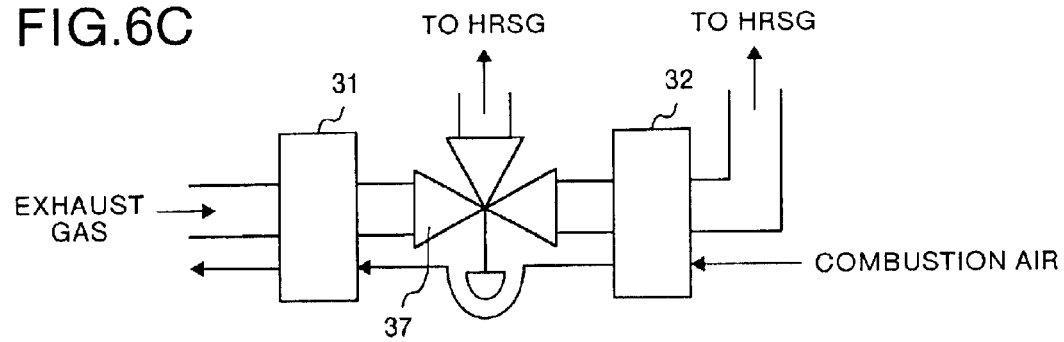
Figure 6D:
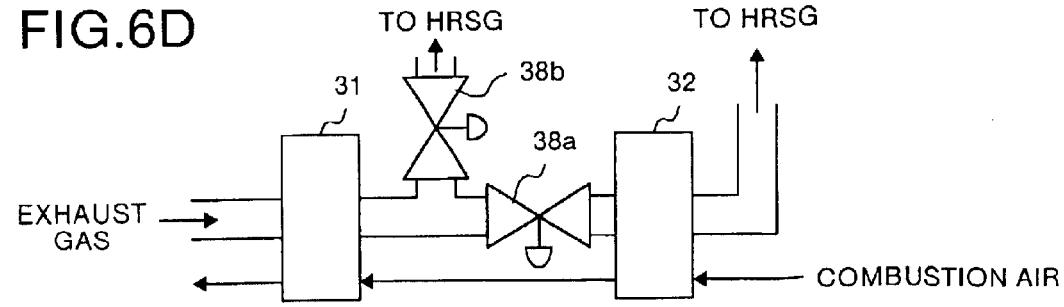

As other examples of the flow adjusting unit, for example, as shown in FIG. 6B and FIG. 6C, a damper 36 or a three-way valve 37 may be provided between the first regenerator 31 and the second regenerator 32, to constitute the flow rate adjusting unit. Alternatively, as shown in FIG. 6D, a plurality of valves 38a and 38b may be combined instead of the damper 36, to thereby constitute the flow rate adjusting unit. A rotary valve as shown in FIG. 10C may be used.

Figure 7:
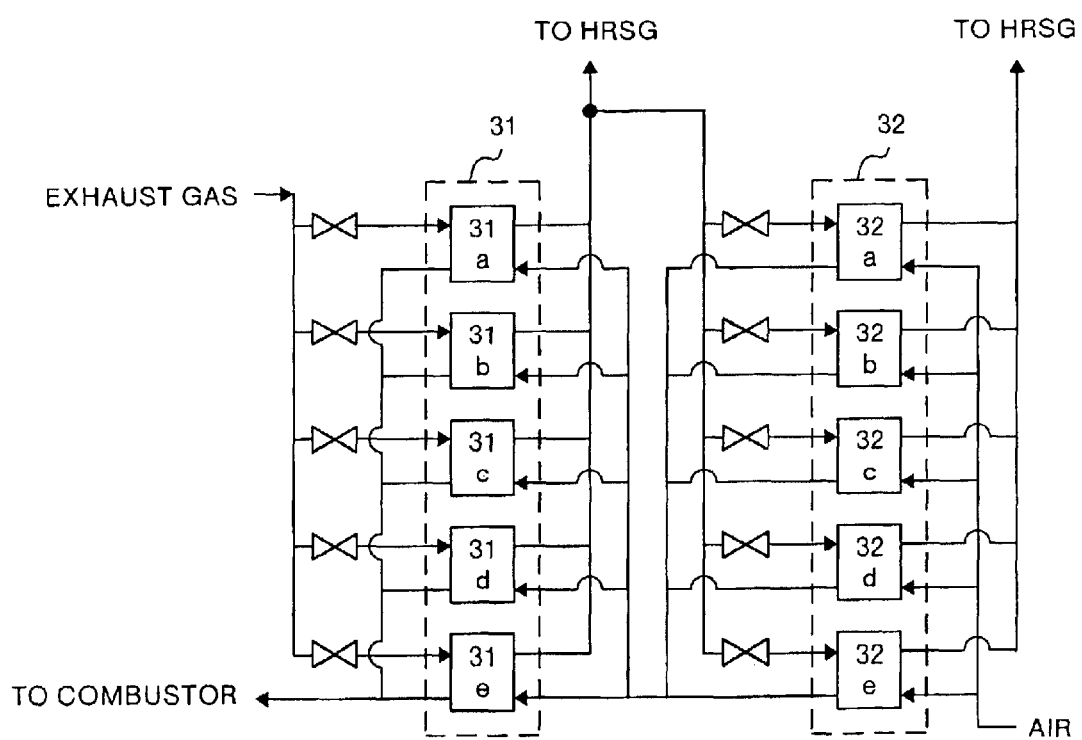
FIG. 7 is an explanatory diagram showing another unit that changes a heat exchanging quantity in the regenerator.

FIG. 7 is an explanatory diagram showing another unit that changes a heat exchanging quantity in the regenerator. As shown in FIG. 7, a plurality of first regenerators 31 and a plurality of second regenerators 32 (five each in this example) are provided to adjust the number of regenerators that supply exhaust gas corresponding to a load, thereby a flow rate of the exhaust gas to be supplied to the regenerators, being an air heating unit, may be adjusted. For example, when it is desired to decrease a heat exchanging quantity in the first regenerator 31, the number of regenerators that supply the exhaust gas may be reduced. It is noted that air from compressor 22 (see FIG. 5) is supplied to all regenerators 31a to 31e.

It is considered an example in which a heat exchanging quantity in the first regenerator 31 is to be decreased. In this case, exhaust gas is supplied to the regenerators 31a, 31c, and 31e, but is not supplied to the regenerators 31b and 31d. For this switchover, switching units such as individual valves provided upstream of the regenerators 31a to 31e, respectively, may be used. At this time, air from compressor 22 (see FIG. 5) is supplied to all the regenerators 31a to 31e. By performing such switching, heat exchange between the exhaust gas and the air does not occur in any regenerators to which the exhaust gas is not supplied, and hence the heat exchanging quantity can be reduced in terms of the first regenerator 31 in its entirety. When it is desired to increase the heat exchanging quantity, on the contrary, the number of regenerators to which the exhaust gas is supplied may be increased.

The first regenerator 31 and the second regenerator 32 having such heat exchanging units are provided, and when a load of the gas turbine combined plant 102 (see FIG. 5) changes, the heat exchanging quantity in the first regenerator 31 and the second regenerator 32 is changed corresponding to this changed load. By performing such a control, even if a load of the gas turbine combined plant 102 changes, exhaust gas having an optimum temperature can be supplied to each of the heat recovery stages in the HRSG 13 (see FIG. 5). Therefore, since the heat exchanging quantity in the HRSG 13 can be suppressed to a minimum, it is possible to suppress a drop of combined efficiency of the gas turbine combined plant 102 due to fluctuations of the load.

A fourth embodiment of this invention will be explained below.

Figure 8:
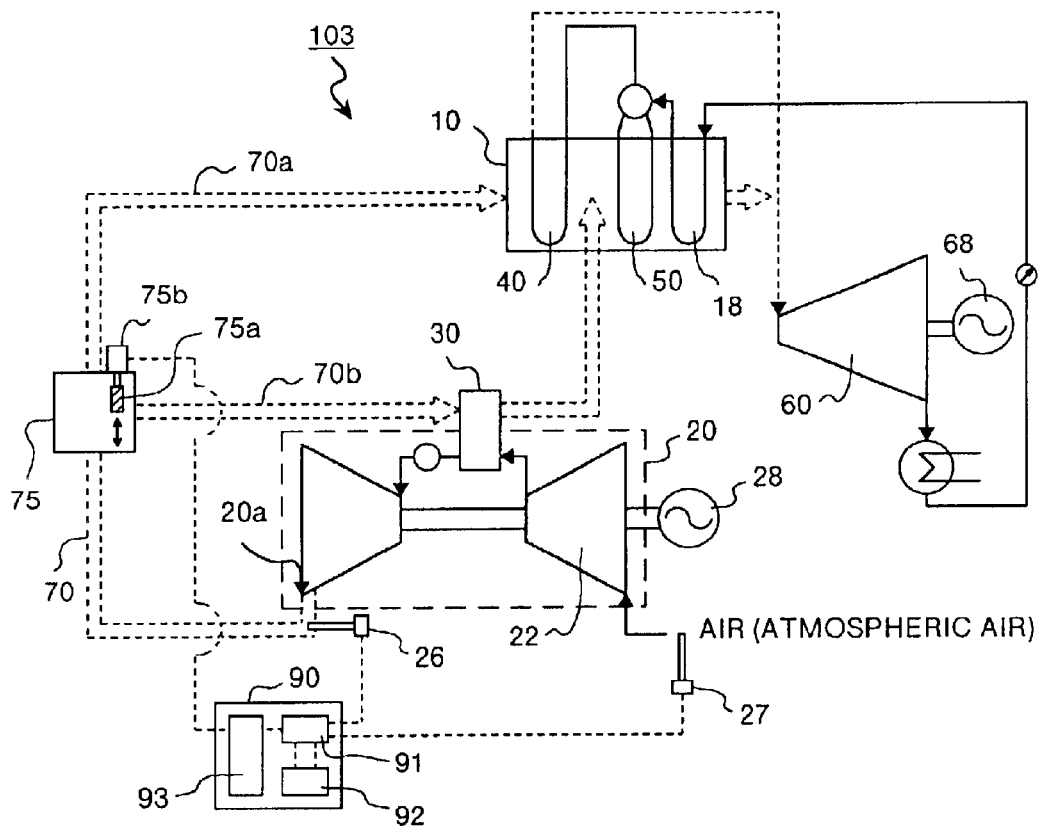
FIG. 8 is an explanatory diagram showing a gas turbine combined plant according to a fourth embodiment of this invention.

FIG. 8 is an explanatory diagram showing a gas turbine combined plant according to a fourth embodiment of this invention. This gas turbine combined plant 103 has substantially the same configuration as that of the gas turbine combined plant 100, but it is different in that the plant 103 is provided with a branch flow adjusting unit, that adjusts a flow rate of exhaust gas to be supplied to HRSG 10 as an exhaust heat recovery unit and regenerator 30 as an air heating unit, at branch portion 78 (see FIG. 1A) provided in piping 70 which is an exhaust gas branch line. The rest of the configuration is the same as that of the first embodiment, and therefore an explanation thereof is omitted and the same components are denoted by the same reference symbols.

Figure 9:
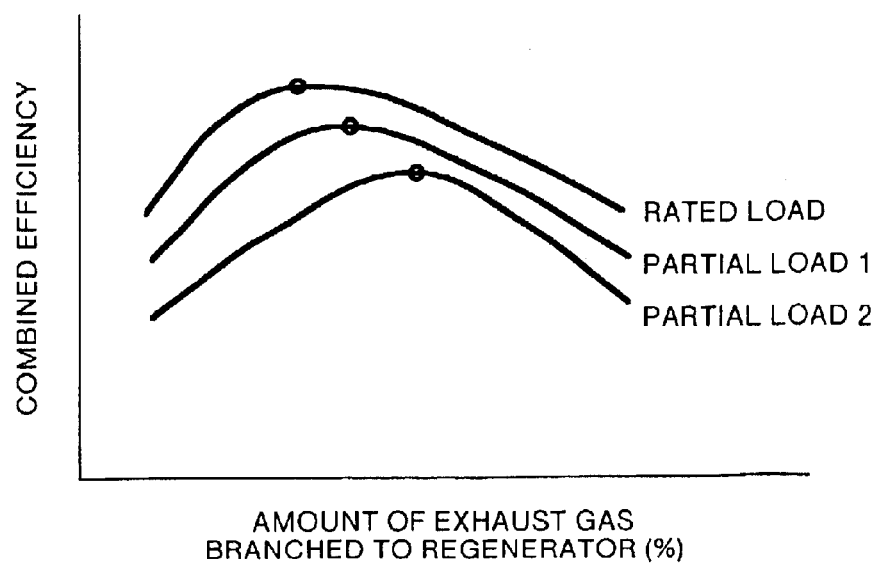
FIG. 9 is an explanatory diagram showing a relationship between combined efficiency and an amount of exhaust gas branched to the regenerator, when load of the plant is changed.

The gas turbine combined plant 103 includes a damper 75 that is the branch flow adjusting unit provided at the branch portion 78 (see FIG. 1A) of the piping 70 as the exhaust gas branch line that supplies exhaust gas to the HRSG 10 and the regenerator 30 so as to adjust a flow rate of the exhaust gas to be supplied to the HRSG 10 and the regenerator 30. A reason thereof will be explained with reference to FIG. 9. FIG. 9 is an explanatory diagram showing a relationship between combined efficiency and an amount of exhaust gas branched to the regenerator when a load of the plant is changed. As shown in this figure, in the gas turbine combined plant, the combined efficiency changes corresponding to the load, and at the same time, there exists an optimum value for an amount of branch exhaust gas to be supplied to the regenerator 30. Therefore, a flow rate of the exhaust gas to be supplied to the regenerator 30 is adjusted at a time of partial load or at a time of full load, so that operation is possible with the combined efficiency being kept high, even if the load is changed.

The branch flow adjusting unit applicable to this invention includes the damper 75. When the damper 75 is used, simply opening or closing a switching door 75a can adjust a flow rate of the exhaust gas, thereby allowing the branch flow adjusting unit to have a simple structure, which is preferable. Particularly, in a large gas turbine combined plant, a large amount of exhaust gas is supplied to the HRSG 10, and therefore pipings 70, 70a are formed of a duct having an outer size of from 4 m to 5 m. Therefore, it is more preferable to use the damper, because the branch flow adjusting unit can be formed in a simpler manner and be light in weight, as compared with a case of using a valve structure.

Figure 10A:
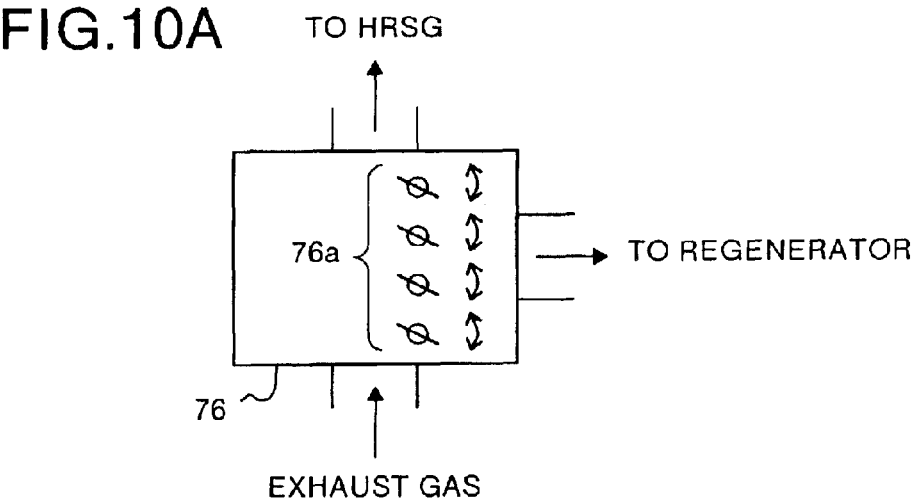
FIG. 10A to FIG. 10C are explanatory diagrams each showing another example of a branch flow adjusting unit according to the fourth embodiment.
Figure 10B:
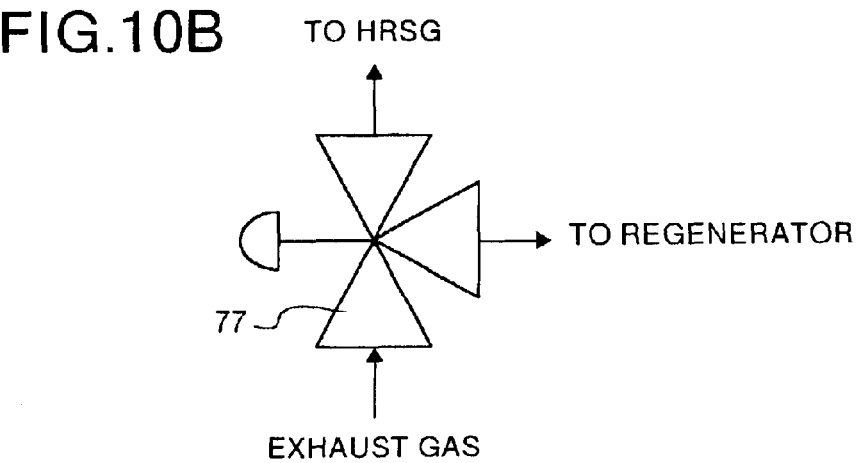
Figure 10C:
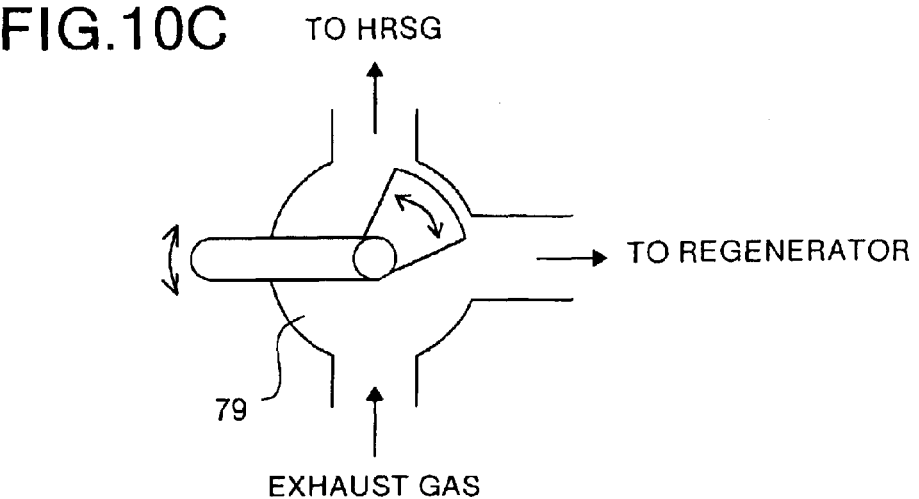

FIG. 10A to FIG. 10C are explanatory diagrams each showing another example of the branch flow adjusting unit according to the fourth embodiment. As a damper 76 shown in FIG. 10A, the damper may be formed of a plurality of switching doors 76a. In this damper 76, the damper can be formed by combining small switching doors 76a, and therefore the switching doors 76a can be manufactured more easily, particularly when large-sized pipings 70, 70a are used. Since the size of the switching doors 76a is small, a force of exhaust gas acting on each of the switching doors 76a becomes smaller than that of the switching door. Therefore, even if a strength of the switching doors 76a is decreased, the switching doors 76a can endure an impact of the exhaust gas. Hence, manufacturing cost of the damper 76 can be reduced. Further, a driving force of the switching doors 76a can be reduced, and therefore energy for control can also be decreased.

As shown in FIG. 10B, the branch flow adjusting unit may be formed of a three-way valve 77, or as shown in FIG. 6D, a plurality of valves may be combined to form the branch flow adjusting unit. In this case, the structure becomes slightly complicated, but accuracy of flow rate control can be increased, and hence it is preferable. Further, as shown in FIG. 10C, a rotary valve 79 may be used to form the branch flow adjusting unit. In the fourth embodiment, the damper 75, being the branch flow adjusting unit, is provided in the gas turbine combined plant 100 (see FIG. 1A) according to the first embodiment, but it is not limited to the first embodiment and the branch flow adjusting unit can be provided in the gas turbine combined plant of other embodiments. For example, damper 75, which is the branch flow adjusting unit, can be provided in the gas turbine combined plant 101 or 102 according to the second or third embodiment in a like manner. In this case, the same action and effects as explained above are exhibited (hereinafter the same).

A method of operating the gas turbine combined plant 103 having the branch flow adjusting unit will be explained below. Referring to FIG. 8 will aid in understanding this explanation. In the gas turbine combined plant 103, if a flow rate of exhaust gas to be supplied to the regenerator 30 is increased at a low temperature of the exhaust gas, a decrease of combined efficiency due to a drop of this exhaust gas temperature can be suppressed. At a time of partial load, the exhaust gas temperature of the gas turbine 20 is lower than that at a time of rated load. Therefore, by increasing the flow rate of the exhaust gas to be supplied to the regenerator 30, a drop of combined efficiency can be suppressed.

Immediately after the gas turbine combined plant 103 has been activated, the exhaust gas temperature of the gas turbine 20 is still low, and therefore the flow rate of the exhaust gas to be supplied to the regenerator 30 is increased, by adjusting an opening of the damper 75. As the gas turbine 20 is warmed up and the exhaust gas temperature rises to thereby increase an amount of steam generated by the HRSG 10, the opening of the damper 75 is adjusted to reduce the flow rate of the exhaust gas to be supplied to the regenerator 30. At this time, a signal for operating the damper 75, being the flow rate adjusting unit, is generated in a processor 91 of a control unit 90, based on temperature information from a thermometer 26 provided at an exhaust gas outlet 20a of the gas turbine 20. A relationship between the exhaust gas temperature and the opening of the damper 75 may be stored in advance in a memory section 92 of the control unit 90, and opening information in the memory section 92 may be referred to when the processor 91 receives the temperature information from the thermometer 26.

When a controller 93 of the control unit 90 receives this signal, the controller 93 transmits a drive signal to an actuator 75b provided in the damper 75 to drive the actuator 75b, to thereby open or close the switching door 75a. The opening of the damper 75 may be controlled by output information of generator 28 or the like, that is, load information of the gas turbine combined plant 103, instead of the temperature information. By controlling the damper 75 based on the load information, the control unit 90 can be operated in accordance with an operation schedule programmed in advance.

Atmospheric temperature is measured together with an exhaust gas temperature by a thermometer 27, and the opening of the damper 75 may be controlled based on temperature information of these two measurements. If the atmospheric temperature is also used as control information, a more precise flow rate control of the exhaust gas can be performed as compared with a case in which the exhaust gas temperature is singly used, thereby a drop of combined efficiency can be further suppressed, which is preferable. At this time, the configuration may be such that a table representing a relationship between the exhaust gas temperature and the atmospheric temperature and the opening of the damper 75 is stored in advance in the memory section 92 of the control unit 90, and the processor 91 refers to this table to generate a signal for operating the switching door 75a.

The processor 91 may be realized by special-purpose hardware, or the processor 91 may be constituted of a memory and a CPU (central processing unit) to serve its function by loading a program (not shown), for realizing a function of the processor, into the memory and executing the program. This program may be for realizing a part of the function, and further, the function may be realized by combining the program with a program already stored in a computer system.

Further, an input unit, display unit, and the like (not shown), as peripheral equipment, may be connected to the control unit 90. The input unit stands for input devices such as a keyboard and a mouse. The display unit stands for a CRT (Cathode Ray Tube) and a liquid crystal display unit.

A fifth embodiment of this invention will be explained below.

Figure 11:
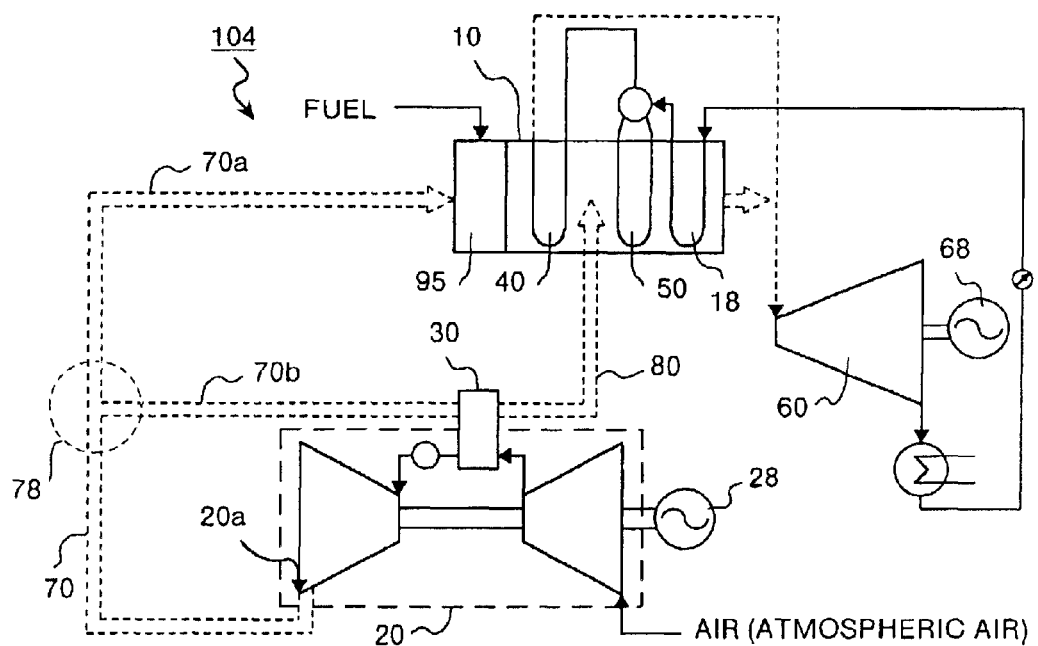
FIG. 11 is an explanatory diagram showing a gas turbine combined plant according to a fifth embodiment of this invention.

FIG. 11 is an explanatory diagram showing a gas turbine combined plant according to a fifth embodiment of this invention. This gas turbine combined plant 104 has substantially the same configuration as that of the gas turbine combined plant 100, but it is different in that the plant 104 includes an exhaust gas re-combustion unit, that supplies fuel to exhaust gas to reburn the exhaust gas, provided between branch portion 78 of piping 70 and HRSG 10. The rest of the configuration is the same as that of the first to fourth embodiments, and therefore an explanation thereof is omitted and the same components are denoted by the same reference symbols.

Exhaust gas of gas turbine 20 is branched at the branch portion 78 of the piping 70, and one of these branches of exhaust gas is supplied to high-pressure superheater 40 that is a superheating unit in the HRSG 10, being an exhaust heat recovery unit. A combustion improving device 95, being an exhaust gas re-combustion unit, is provided at an inlet of the HRSG 10, wherein fuel is provided to high-temperature exhaust gas, to thereby reburn the exhaust gas. The combustion improving device 95 may be provided in piping 70*a* that connects the branch portion 78 to the HRSG 10.

Since the exhaust gas of the gas turbine 20 is reburnt by the combustion improving device 95, the exhaust gas whose temperature has been raised can be supplied to the high-pressure superheater 40 in the HRSG 10. Thereby, a temperature of high-pressure superheated steam generated by the high-pressure superheater 40 can be raised, and hence a steam temperature at an inlet of high-pressure steam turbine 60 is also raised. Therefore, an output of the high-pressure steam turbine 60 can be increased, which allows an output of a generator 68 to also be increased. Further, the combustion improving device 95 is provided integrally with the HRSG 10, and therefore it is not necessary to provide the combustion improving device 95 as a separate body. Thus, it is preferable that a piping system can be constructed relatively easily.

Further, the combustion improving device 95 may be provided between the gas turbine 20 and the branch portion 78. By having such a configuration, the exhaust gas whose temperature has been raised can be supplied to both the HRSG 10 and regenerator 30, being an air heating unit, and hence an output of the gas turbine 20 can also be increased at the same time. As a result, an output of the gas turbine combined plant 104 in its entirety can be further increased.

The combustion improving device 95 may be provided both in the piping 70*a* that connects the branch portion 78 and the HRSG 10, and in a piping 70*b* that connects the branch portion 78 and regenerator 30. By having such a configuration, a temperature of exhaust gas to be supplied to the HRSG 10 and the regenerator 30 can be separately raised, thereby enabling control taking combined efficiency into consideration, which is preferable. In this case, if the combustion improving device 95 is formed integrally with the HRSG 10 and the regenerator 30, the configuration becomes relatively simple. Further, the piping 70*a* and 70*b* can be formed of a material having a relatively low heat-resistance, thereby installation expenses of the piping 70*a* and 70*b* can be preferably minimized.

A combined efficiency of the gas turbine combined plant 104, when the combustion improving device 95 is operated, becomes lower than a case in which the combustion improving device 95 is not operated, but an output of power generation itself of the gas turbine combined plant 104 can be increased. Therefore, when electric power demand is large, particularly from around noon to three o'clock in the afternoon in the summer time, such operation is possible as to ignore a temporary drop of the combined efficiency and to operate the combustion improving device 95 to deal with the power demand.

As described above, when the combustion improving device 95 is further provided, an operation range of the gas turbine combined plant 104 is increased, which is preferable. In the fifth embodiment, the combustion improving device 95 is provided in the gas turbine combined plant 100 (see FIG. 1A) according to the first embodiment, but the combustion improving device 95 can be provided in any plant of the other embodiments. That is, the combustion improving device 95 can be provided in the gas turbine combined plants 101 to 103 according to the second to fourth embodiments in a like manner. In this case, a similar action and effects can be exhibited as well.

As explained above, in the gas turbine combined plant according to one aspect of this invention, exhaust gas of a gas turbine is branched, and a part of the exhaust gas is supplied to an air heating unit, and the remaining exhaust gas is supplied to an exhaust heat recovery unit. As a result, the exhaust gas, whose temperature is prevented from dropping, can be supplied at an appropriate flow rate to a superheating unit in a heat recovery stage provided in the exhaust heat recovery unit, and hence a heat exchange loss in the superheating unit is reduced. Another part of the branched exhaust gas is allowed to pass through the air heating unit so as to heat combustion air of the gas turbine. As a result, efficiency of the gas turbine can be improved. Further, the exhaust gas, after having been heat-exchanged in the air heating unit, is supplied to between the superheating unit and an evaporation unit, to thereby decrease a difference between an inlet temperature and an outlet temperature of the evaporation unit as compared to that of the conventional art. As a result, a heat exchange loss in the evaporation unit can be further reduced. By these actions, a heat exchange loss in the exhaust heat recovery unit can be reduced, and efficiency of the gas turbine can be improved as compared to the conventional art, thereby enabling further improvement in combined efficiency.

Moreover, when the exhaust heat recovery unit comprises a plurality of heat recovery stages, the exhaust gas after having passed through the air heating unit is supplied to between the superheating unit and the evaporation unit provided in the heat recovery stage, to which the exhaust gas having the highest temperature is supplied. Therefore, an exhaust gas temperature at the inlet of the evaporation unit can be dropped, and hence a temperature difference between the inlet and the outlet of the evaporation unit can be reduced as compared to the conventional art, to thereby reduce a heat exchange loss in the evaporation unit. As a result, a heat exchange loss in the exhaust heat recovery unit can be reduced as compared to the conventional art, and hence combined efficiency can be improved further.

In the gas turbine combined plant according to another aspect of this invention, exhaust gas of the gas turbine to be supplied to the exhaust heat recovery unit is branched, and a part of the exhaust gas is supplied to a plurality of air heating units, for heating combustion air of the gas turbine in a stepwise manner. A plurality of heat recovery stages is also provided, where thermal energy contained in the exhaust gas of the gas turbine is recovered in a stepwise manner. The exhaust gas after having been heat-exchanged in the air heating unit is supplied to between the superheating unit and the evaporation unit in a most suitable heat recovery stage, according to a temperature of the exhaust gas. In this manner, thermal energy contained in the exhaust gas of the gas turbine is recovered in a stepwise manner in the heat recovery stage and the air heating unit, and therefore the thermal energy of the exhaust gas can be recovered more efficiently. Further, since the exhaust gas is branched, a part thereof is supplied to the air heating unit, and the remaining part is supplied to the exhaust heat recovery unit. Therefore, the exhaust gas can be supplied to the exhaust heat recovery unit at an appropriate flow rate. Accordingly, a heat exchange loss in the superheating unit provided in the heat recovery stage can be reduced as compared to the conventional art. Further, the exhaust gas after having been heat-exchanged in the air heating unit is supplied to the inlet of the evaporation unit having the most suitable temperature condition according to a temperature thereof, and hence a heat exchange loss in the evaporation unit can be reduced further. By these actions, combined efficiency can be improved further as compared to the conventional art.

Furthermore, the gas turbine combined plant is provided with a flow rate adjusting unit that adjusts a flow rate of the exhaust gas passing through the air heating units in the first stage. By this flow rate adjusting unit, the exhaust gas in the most suitable amount can be supplied to the evaporation unit provided in the heat recovery stage, according to a load of the plant and conditions of atmospheric temperature and the like. Therefore, even if the load of the plant and an atmospheric temperature condition and the like change, a heat exchange loss in the evaporation unit can be suppressed, whereby a drop of combined efficiency can be minimized. Thus, it is possible to operate the plant while maintaining a high combined efficiency.

Moreover, an exhaust gas branch line is provided with a branch flow adjusting unit that adjusts branch flow of the exhaust gas to be supplied to the air heating unit. Therefore, the exhaust gas can be supplied to the exhaust heat recovery unit and the air heating unit, in a most suitable amount according to a load of the plant and conditions of atmospheric temperature and the like. As a result, even if the load of the plant and an atmospheric temperature condition and the like change, a drop of combined efficiency can be minimized. Thus, it is possible to operate the plant while maintaining high combined efficiency.

Furthermore, the exhaust gas branch line is further provided with an exhaust gas re-combustion unit that supplies fuel to the exhaust gas to reburn the exhaust gas. By this re-combustion unit, a temperature of the exhaust gas supplied to the exhaust heat recovery unit can be increased, and hence a temperature of steam superheated by the superheating unit can be increased, thereby increasing an output of a steam turbine to which this steam is supplied. Accordingly, an output of the plant can also be increased. When there is a large electric power demand, particularly, in the afternoon in midsummer, the gas turbine combined plant can be used in such a manner that an output of the plant is increased by the re-combustion unit to thereby deal with this demand, thus enabling extensive plant operation.

Moreover, the re-combustion unit is provided between the branch portion in the exhaust gas branch line and the exhaust heat recovery unit, and hence a length of the exhaust gas branch line that deals with reburnt high-temperature exhaust gas can be made shorter. Accordingly, any material having a relatively low heat-resistance may be used as a component of the exhaust gas branch line. As a result, manufacturing of the exhaust gas branch line becomes relatively easy, and installation expenses can also be reduced.

Furthermore, the gas turbine combined plant of this invention is provided with a control unit that controls the branch flow adjusting unit, so that a flow rate of the exhaust gas to be supplied to the air heating unit is reduced as a temperature of the exhaust gas of the gas turbine increases. In this manner, the branch flow adjusting unit is controlled based on an exhaust gas temperature of the gas turbine, thereby enabling control with fast response. Moreover, the gas turbine combined plant of this invention is provided with a control unit that controls the branch flow adjusting unit based on a load of the plant. By having such a configuration, the gas turbine combined plant can be controlled in accordance with an operation program set in advance according to an operation schedule.

A method of operating the gas turbine combined plant according to still another aspect of this invention, comprises reducing a flow rate of exhaust gas to be supplied to the air heating unit as a temperature of the exhaust gas of the gas turbine increases. Further, the method of operating the gas turbine combined plant of this invention according to still another aspect of this invention, comprises reducing a flow rate of exhaust gas to be supplied to the air heating unit as a load of the gas turbine combined plant increases. In these methods, the flow rate of the exhaust gas to be supplied to the air heating unit is reduced as an exhaust gas temperature of the gas turbine increases, or as a load of the gas turbine combined plant increases. Therefore, even if the temperature of the exhaust gas, the load of the plant, or other factors change, a drop of combined efficiency can be suppressed to a minimum. Thus, it is possible to operate the gas turbine combined plant while maintaining high combined efficiency.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gas turbine combined plant comprising:
   a gas turbine;
   an exhaust heat recovery unit for recovering thermal energy contained in an exhaust gas of said gas turbine;
   heat recovery stages in said exhaust heat recovery unit, each of said heat recovery stages including a superheating unit and an evaporation unit;
   an air heating unit;
   an exhaust gas branch line having a branch portion for branching the exhaust gas of said gas turbine into first and second branches, supplying the first branch of the exhaust gas to said exhaust heat recovery unit, and supplying and the second branch of the exhaust gas to said air heating unit so as to heat combustion air of said gas turbine; and
   an exhaust gas supply line for supplying the second branch of the exhaust gas, after heating the combustion air of said gas turbine, to between said superheating unit and said evaporation unit of a downstream heat recovery stage relative to a first of said heat recovery stages in said exhaust heat recovery unit.

2. The gas turbine combined plant according to claim 1, wherein said exhaust gas branch line includes a branch flow adjusting unit for adjusting a flow rate of the second branch of the exhaust gas that is to be supplied to said air heating unit.

3. The gas turbine combined plant according to claim 2, further comprising:
   a control unit including
      (i) a processor for generating a signal for operating said branch flow adjusting unit so that a flow rate of the second branch of the exhaust gas that is to be supplied to said air heating unit is reduced as a temperature of the exhaust gas increases, and
      (ii) a controller for operating said branch flow adjusting unit based on a signal received from said processor so as to change a flow rate of the second branch of the exhaust gas that is to be supplied to said air heating unit.

4. The gas turbine combined plant according to claim 2, further comprising:
   a control unit including
      (i) a processor for generating a signal for operating said branch flow adjusting unit so that a flow rate of the second branch of the exhaust gas that is to be supplied to said air heating unit is reduced as a load of the gas turbine combined plant increases, and
      (ii) a controller for operating said branch flow adjusting unit based on a signal received from said processor so as to change a flow rate of the second branch of the exhaust gas that is to be supplied to said air heating unit.

5. The gas turbine combined plant according to claim 1, wherein said exhaust gas branch line includes an exhaust gas re-combustion unit for supplying fuel to at least a portion of the exhaust gas so as to reburn this portion of the exhaust gas.

6. A gas turbine combined plant comprising:
   a gas turbine;
   an exhaust heat recovery unit for recovering thermal energy contained in an exhaust gas of said gas turbine;
   heat recovery stages in said exhaust heat recovery unit, each of said heat recovery stages including a superheating unit and an evaporation unit;
   air heating units;
   an exhaust gas branch line having a branch portion for branching the exhaust gas of said gas turbine into first and second branches, supplying the first branch of the exhaust gas to said exhaust heat recovery unit, and supplying and the second branch of the exhaust gas to said heating units so as to heat combustion air of said gas turbine;
   a first-stage exhaust gas supply line for supplying a portion of the second branch of the exhaust gas, after heating the combustion air of said gas turbine in one of said air heating units, to between said superheating unit and said evaporation unit of one of said heat recovery stages in said exhaust heat recovery unit; and
   a subsequent-stage exhaust gas supply line for supplying a portion of the second branch of the exhaust gas, after heating the combustion air of said gas turbine in another of said air heating units, to between said superheating unit and said evaporation unit of another of said heat recovery stages in said exhaust heat recovery unit.

7. The gas turbine combined plant according to claim 6, further comprising:
   a flow rate adjusting unit for adjusting a flow rate of at least one of the portion of the second branch of the exhaust gas that is to pass through said one of said air heating units and the portion of the second branch of the exhaust gas that is to pass through said another of said air heating units.

8. The gas turbine combined plant according to claim 6, wherein said exhaust gas branch line includes a branch flow adjusting unit for adjusting a flow rate of the second branch of the exhaust gas that is to be supplied to said air heating units.

9. The gas turbine combined plant according to claim 8, further comprising:
   a control unit including
      (i) a processor for generating a signal for operating said branch flow adjusting unit so that a flow rate of the second branch of the exhaust gas that is to be supplied to said air heating units is reduced as a temperature of the exhaust gas increases, and
      (ii) a controller for operating said branch flow adjusting unit based on a signal received from said processor so as to change a flow rate of the second branch of the exhaust gas that is to be supplied to said air heating units.

10. The gas turbine combined plant according to claim 8, further comprising:
    a control unit including
       (i) a processor for generating a signal for operating said branch flow adjusting unit so that a flow rate of the second branch of the exhaust gas that is to be supplied to said air heating units is reduced as a load of the gas turbine combined plant increases, and
       (ii) a controller for operating said branch flow adjusting unit based on a signal received from said processor so as to change a flow rate of the second branch of the exhaust gas that is to be supplied to said air heating units.

11. The gas turbine combined plant according to claim 6, wherein said exhaust gas branch line includes an exhaust gas re-combustion unit for supplying fuel to at least a portion of the exhaust gas so as to reburn this portion of the exhaust gas.

12. The gas turbine combined plant according to claim 11, wherein said re-combustion unit is provided between said branch portion of said exhaust gas branch line and said exhaust heat recovery unit.

13. A method of operating a gas turbine combined plant including a gas turbine, at least one air heating unit, an exhaust heat recovery unit, and heat recovery stages in said exhaust heat recovery unit, with each of said heat recovery stages including a superheating unit and an evaporation unit, said method comprising:
    supplying a portion of exhaust gas of said gas turbine to said at least one heating unit such that combustion air of said gas turbine is heated, by said portion of said exhaust gas, in said at least one heating unit;
    supplying said portion of said exhaust gas, after heating said combustion air in said at least one heating unit, to between said superheating unit and said evaporation unit of a downstream heat recovery stage relative to a first of said heat recovery stages; and
    recovering thermal energy from said exhaust gas in said heat recovery stages.

14. The method according to claim 13, further comprising:
    reducing a flow rate of said portion of exhaust gas supplied to said at least one heating unit in response to a temperature of said exhaust gas increasing.

15. The method according to claim 14, wherein
    reducing a flow rate of said portion of exhaust gas comprises using at least one of a damper, a three-way valve, a combination of valves, and a rotary valve to reduce said flow rate of said portion of exhaust gas.

16. The method according to claim 13, further comprising:

reducing a flow rate of said portion of exhaust gas supplied to said at least one heating unit in response to a load of the gas turbine combined plant increasing.

17. The method according to claim 16, wherein reducing a flow rate of said portion of exhaust gas comprises using at least one of a damper, a three-way valve, a combination of valves, and a rotary valve to reduce said flow rate of said portion of exhaust gas.

18. The method according to claim 13, wherein said at least one air heating unit comprises plural air heating units.

19. The method according to claim 13, further comprising:

adjusting a flow rate of said portion of exhaust gas supplied to said at least one heating unit.

* * * * *